United States Patent [19]
Streater

[11] Patent Number: 5,831,677
[45] Date of Patent: Nov. 3, 1998

[54] COMPARISON OF BINARY CODED REPRESENTATIONS OF IMAGES FOR COMPRESSION

[75] Inventor: Stephen B. Streater, London, United Kingdom

[73] Assignee: Eidos PLC., Middlesex, United Kingdom

[21] Appl. No.: 663,285
[22] PCT Filed: Dec. 7, 1994
[86] PCT No.: PCT/GB94/02683
    § 371 Date: Aug. 29, 1996
    § 102(e) Date: Aug. 29, 1996
[87] PCT Pub. No.: WO95/16325
    PCT Pub. Date: Jun. 15, 1995

[30] Foreign Application Priority Data

Dec. 7, 1993 [GB] United Kingdom ............ 9325073

[51] Int. Cl.$^6$ ........................................ H04N 7/32
[52] U.S. Cl. ........................................ 348/415
[58] Field of Search ............... 348/416, 415, 348/409, 402, 401, 400, 390, 384; 382/275, 238, 236, 232; H04N 7/137

[56] References Cited

U.S. PATENT DOCUMENTS

| | | | |
|---|---|---|---|
| 4,807,033 | 2/1989 | Keesen et al. | 348/407 |
| 4,847,677 | 7/1989 | Music et al. | 348/391 |
| 4,903,124 | 2/1990 | Hoshi et al. | 348/422 |
| 5,008,748 | 4/1991 | Carr et al. | 348/417 |
| 5,060,285 | 10/1991 | Dixit et al. | 382/253 |
| 5,428,403 | 6/1995 | Andrew et al. | 348/402 |

FOREIGN PATENT DOCUMENTS

| | | |
|---|---|---|
| 331 094 | 9/1989 | European Pat. Off. . |
| 375 056 | 6/1990 | European Pat. Off. . |
| 409 602 | 1/1991 | European Pat. Off. . |
| 443 676 | 8/1991 | European Pat. Off. . |
| 490 540 | 6/1992 | European Pat. Off. . |
| 514 053 | 11/1992 | European Pat. Off. . |
| 569 207 | 11/1993 | European Pat. Off. . |
| 594 338 | 4/1994 | European Pat. Off. . |
| 606 675 | 7/1994 | European Pat. Off. . |
| WO 87/03768 | 6/1987 | WIPO . |
| WO 92/07359 | 4/1992 | WIPO . |

OTHER PUBLICATIONS

"Linear Filtering for Reducing Blocking Effects in Orthogonal Transform Image Coding" by Avril et al. Paper No. 92–001, *Journal of Electronic Imaging Apr. 1992.*

"Adaptive Dynamic Range Coding Scheme for Future HDTV Digital VTR" by Kondo et al, Proceedings of Fourth Intl. Workshop on HDTV and beyond, Italy, Sep. 1991.

"Codeword–Dependent Post–Filtering for Vector Quantization–Based Compression" by Ashok K. Rao, 1993 IEEE Intl Symposium on Circuits and Systems, Mar. 1993.

*Primary Examiner*—Bryan Tung
*Attorney, Agent, or Firm*—Sughrue, Mion, Zinn, Macpeak & Seas, PLLC

[57] ABSTRACT

A method of processing digital video information in real time involves reading-in digital data representing pixels of successive video frames, e.g., from a digitizer. The pixel frame data is initially stored and subjected to an idealization treatment to compare successive portions of the frame data to identify noise effects in the video image and to eliminate such effects. The idealized frame data is then subjected to compression by deriving further data representing blocks of pixels (mini-blocks) and blocks of mini-blocks (super-blocks) and by generating codewords of variable length to describe the changes in the pixel data of successive frames. The compressed data is finally stored and/or transmitted.

17 Claims, 7 Drawing Sheets

Y PIXEL □     MINI-BLOCK □     SUPER-BLOCK

FIG. 7

|   |   |   |   |   |   |
|---|---|---|---|---|---|
| a | a | b | b | c | c |
| a | a | b | b | c | c |
| d | d | e | e | f | f |
| d | d | e | e | f | f |
| g | g | h | h | i | i |
| g | g | h | h | i | i |

COMPARISON OF BINARY CODED REPRESENTATIONS OF IMAGES FOR COMPRESSION

TECHNICAL FIELD

This invention relates to a system for and a method of inter alia capturing and compressing video in real time, and/or for replaying compressed video. The video can either be stored on a computer storage medium such as, but not limited to, a hard disc for future use, or can be transmitted through a communications channel to a receiving station.

EXAMPLE APPLICATIONS

In the digital domain, any application which can make use of video will be enhanced by the ability to process compressed video. Efficient compression and decompression is important in a number of applications, for example those outlined hereunder. Provided below are some descriptions, by way of example only, of how the invention in some of its various forms could be applied.

PSTN video phone

In one version, the invention can be used to provide the video processing required for a video telephone through PSTN (analog) telephone lines. In this case, the video is compressed in real time for transmission. Because of the constraints on bandwidth, the quality is not expected to be very high. For example, 160*120 pixel resolution, 10 frames per second and 32 intensity levels would be one example of image quality. At this frame rate, there is considerable processor time both to improve compression (cf section on learning) and playback (cf section on playback). Typical data rates are between 9.6 kb/s and 30 kb/s. In this case, a hardware based solution such as MPEG would be uneconomical, and current standard alternatives cannot deliver the required compression rates.

ISDN video phone

In another implementation, the invention can be used to produce higher quality images and higher frame rates than before. These pictures may include colour, and will be at higher frame rates than the PSTN version. Typical data rates are between 38.4 kb/s and 128 kb/s. Other solutions exist to this problem (for example H.261), but they are typically much more costly to implement.

Radio Communications

In a further implementation of the invention, data rates of around 256 kb/s could be transmitted by radio to a receiving station. Because the codec can be implemented in software on a low cost computer system, it is relatively straightforward to add extra features, such as error correction, which may be needed over a noisy radio link. The radio communications could be used, for example, for live news or live sport transmissions to an aircraft. Hardware based solutions would not prove as easy to maintain as this invention, as any chances to the specification of the equipment on the aeroplanes could lead to problems with approval on radio emissions.

Multimedia

In a further example of the invention, video data can be compressed and stored on to a computer disc, such as a CD-ROM, for playback in software or hardware on a microcomputer. In this case, data rates of up to about 2 Mb/s are acceptable, although the invention here may need as little as 400 kb/s at the required quality.

Off Line Video Editing

The invention allows the manipulation of large quantities of video data on a computer, and as such can be used for making a digital off line video editing system. In an off line system, the video quality does not have to be as high as broadcast quality, and as such lower data rates could be used. For the professional market, all frames must be captured (for example 25 frames per second in PAL).

Corporate Videos

In another implementation, the invention allows videos of approximately VHS quality to be edited and shown on a microcomputer. This could be used, for example, to make corporate videos. The efficient compression of large quantities of video is vital in this case.

DISCLOSURE OF THE INVENTION

According to the present invention there is provided a method of processing digital video information in an adapted format for real time transmission or storage after compression, said method comprising:

reading digital data representing individual picture elements (pixels) of a video image frame as a series of binary coded words, deriving from the words representing individual pixels further words each describing first and second blocks or groups of pixels of which the second group is a sub-set of the first group and includes a representation of the luminance of 2×2 pixel blocks, comparing and evaluating the words of the second groups representing corresponding portions of one frame with another frame or other frames in a pre-determined sequential order of the elements making up successive first groups to detect changes, using the comparison to take the second group to represent all the individual pixels described by the group whenever the detected change is significant; and using variable length code words to represent the number of consecutive components of the second groups without significant change.

In a practical realisation of the method, the words representing corresponding portions of the one frame are derived from a current frame and the other frame or frames are previous frames and/or in the case of storage succeeding frames.

In a preferred form the method further comprises storing for use in the comparison step information from the first group representing a portion of an entire frame and using a code word to describe the stored information to enable the stored information to be analysed and used whenever a significant change is subsequently detected and the stored information is also acceptable to describe the corresponding portion of the current frame.

In a more refined case the storing step involves storing a plurality of code words representing like portions of a number of frames for use in the analysis step which are temporally spaced apart from one another with older frames tending to be temporally spaced by greater time intervals.

A robust implementation of the invention assesses the respective words representing pixels to ascertain changes between portions of one frame and the other frame or frames to detect changes likely to signify noise or extraneous effects present in the video image and using this assessment to filter out information attributable to such noise or extraneous effects.

The assessment step referred to above continuously maintains optimally large corresponding successive portions of frames with uniform pixels.

In a preferred implementation of the invention the assessment produces a multi-bit code signifying the extent of the detected change on a cumulative basis for both luminance and chrominance comparisons and there is a range of cumulative bit value changes and/or rates of bit value changes which are acceptable as signifying noise or extraneous effects and which are filtered out and two limiting cumulative changes and two limiting bit value changes which if exceeded are taken as signifying a real change in the image and require the words representing the image to be updated by being replaced by other words and information cf FIG. 2.

In another implementation of the invention, designed for use in video communications over low bandwidth links, the assessment is performed before the comparison and evaluation and there is a threshold of acceptable changes before the change is taken as significant and the compressed version of the current frame is continuously stored and updated.

In a software implementation of the invention the digital data which is read in comprises words of up to 8 bits for pixel luminance and words of up to 8 bits for each component of pixel chrominance, and where and the words derived from the data each have the least significant bits describing the pixel chrominance or luminance and the most significant bits describing the relationship between the pixel chrominance or luminance and that of the other frame or frames.

One implementation attains a higher compression rate because the luminance and chrominance pixels are evaluated separately.

Most versions of the invention comprise first group of pixels as 4×4 blocks each composed of the second group of pixels which consists of both a 2×2 block of luminance pixels and one chrominance pixel.

In another variant of the invention, the stored data representing the pixels is scanned in a predetermined raster sequence running successively through the second group of pixels, each second group of pixels is assessed from the presence of the most significant bits representing whether a significant change has occurred and only where this is the case is the stored data further compressed into its corresponding first group.

Look-up tables have proved useful aids in implementing the comparison and/or assessment steps of this invention.

In one refinement of the invention each of the second group of words defining pixel luminance is derived by compressing the pixel luminance values in two stages namely a first stage comprising calculating the maximum and minimum values of pixel luminance in the pixel block as well as indicators of whether each pixel is nearer the maximum or the minimum and a second stage involving combining the values calculated in the first stage to form a shortened code word.

In the above case the shortened code words can be selected from a set in which all adjacent or close maximum and minimum values are represented and some medium and large differences with values are represented and the selection is based on the mean of tie maximum and minimum values represented by the code word being as near as possible to the mean of the calculated values, the minimum code word value $\geq$ the minimum calculated value, the maximum code word value $\leq$ the maximum calculated value, and the difference between the maximum value in the code word and the minimum value in the code word being as large as possible.

Practical realisations of the invention comprising storing and reading the compressed data representing the video image frames, or receiving the transmitted compressed data, allow the data to be subjected to decompression.

In the case where it is required that the frame size be increased after compression has been completed, the decompression step is enhanced by a further processing of the data luminance pixels said process involving the replication of each pixel into a 2×2 pixel block, evaluating the pixel values in the said block by either combining the values of neighbouring pixels or comparing adjacent pixel values derived from different replicated pixels, calculating the median or the mean depending on the differences, and where the evaluation involves the comparison and the adjacent pixel values are the same and the median case applies then the adjacent pixel value is adopted.

The system described may be divided into four main parts. The first part involves the transfer of information into the system. This may be, for example, by accessing a video digitiser. The second part (which in some instances is combined with the first part or the third part or both) involves the processing of the current frame in such a way as to make it more amenable to processing by the third part described below. When processing the current frame in this second part, information from past frames, future frames or both past and future frames may be taken into account, as well as information from the current frame. In the third part, the processed images are compressed in a way that allows them to be reconstructed. In some implementations, this reconstruction is loss free, whereas in others, it can is a close approximation to the uncompressed and processed image resulting from stages one and two. The effect of the compression is to convert the images into a more efficient representation in terms of storage. The fourth part of the system involves the use of the compressed data. Typically this will either be stored for future use on the local system, or transmitted to a receiving station for immediate or future use.

In one interpretation, there are two broad versions of the invention, called S and T. T is designed for, but not limited to, live transmission. The compression method in T does not need any knowledge of future frames. There is a very small latency between the capture and the transmission. All frames are compressed before the next frame has been digitised. S is designed for storage for future use. In the case of S, latency between video being captured and it having been compressed is not so much of an issue. Thus, in the case of S, the current compressed frame can be based on past, present and future frames.

The video can be captured and compressed in real time on a microcomputer with S and T implemented in software. In both cases, decompression and play back of the compressed video is a less computationally complex task, and is possible in real time in software on a slower personal computer than that needed for capturing. The algorithms are designed to run in software on a cheap, mass produced processor, for example, the ARM610.

S and T only differ in the idealisation of the image, and what is done to the final image (see below).

In one implementation of the invention, compression rates are increased by means of a system for learning from past frames. For example, new shapes from each image could be remembered for future use. Then, in a future frame, if one of the memorised shapes reappeared in a future frame, a short code word would say which shape to use rather than having to describe it at a pixel level. In a computationally simpler version, the image could be split up into blocks, and each block which differed significantly from any previous blocks could be stored in a memory for future use, where necessary. In a computationally even simpler version, each block on the image could relate to a subset of the memory, and only remembered blocks at that position would be used to help the compression. In any of these versions, the memory may be limited to a fixed size (for example 4096 shapes, or 8 shapes per block), and the shapes, memorised could be any size including (for example in a block case) 8 by 8 square pixels.

In one implementation of the invention, each frame is processed in a stage termed "idealisation". In this case, each pixel is processed either temporarily or spatially or both in such a way so as to make the image more amenable to compression. In a typical example, this involves estimating what the image could have looked like if no noise had been present in the original signal. In one example, the idealisation process could involve making use of only temporal information at each position in the image. This may involve only past information (the T case), or it may make use of information from future frames as well (the S case).

BRIEF DESCRIPTION OF THE DRAWINGS

FIG. 7: decompressed image ready to be filtered for display.

BEST MODES FOR CARRYING OUT THE INVENTION

OVERVIEW OF THE VIDEO PROCESSING SYSTEM

One implementation in more detail

In this example, the video processing system can be described in four main parts.

In the first part of the system, the source video data is captured in real time. This could be, for example, off pre-recorded or live source.

In the second part of the system, the captured image is processed to remove noise artifacts and other irrelevant material. This processed image is termed the "idealised image". This involves some subtle and advanced image processing techniques on the captured frames.

The third part of the system consists of a method of compressing the idealised image.

The fourth part of the system consists of storing or transmitting the compressed video.

Figure 1:
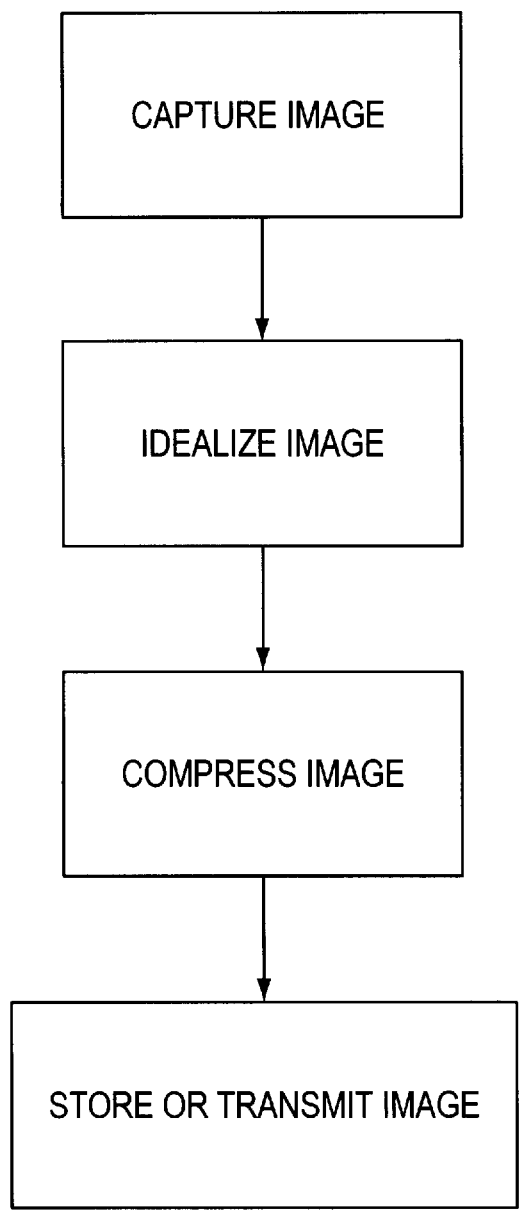
FIG. 1: the four main subdivisions in the invention.

This process is summarised in FIG. 1.

Guidelines on getting the most out of S and T

The following guidelines will improve the picture quality and/or compression rate for pictures compressed using the S or T algorithm.

[1] The source video should have as little noise as possible.
[2] The source video should be captured at 8 bits per component.
[3] The source video should be captured in YUV space.
[4] If every field is not captured, then either all the captured fields should be even or all the captured fields should be odd.
[5] If the source video is lower resolution than the original video source, the source video should be averaged spatially rather than point sampled to lower the spatial resolution.
[6] The frames should be evenly spaced in time.
[7] The fewer frames that are skipped, the better the picture quality.

DETAILS OF THE VIDEO PROCESSING SYSTEM

Typical hardware configuration

The invention is applicable to a wide range of hardware systems. In one case, there is a digitiser which can only be accessed through a slow external data bus. This digitiser can only be accessed part of the time.

In one case, the CPU may have only a small cache RAM, but enough external memory to store at least several frames of uncompressed video.

Hierarchy within the image

In one implementation of the invention (I1), the component of the image with the highest spatial resolution is a luminance pixel.

In this implementation I1, luminance pixels are grouped into 2 by 2 pixel squares, called mini-blocks. The chrominance within each mini-block is constant. In other implementations, the colour areas may correspond to 1*1 luminance pixel squares, 2*1 or 1*2 luminance pixel squares, 4*4 luminance pixel squares, or other sizes, or may be completely absent.

In this implementation I1, mini-blocks are grouped in 4 by 4 squares, called super-blocks. Thus each super-block contains 64 luminance pixels, and 16 chrominance pixels. In other implementations, super-blocks may be larger or smaller, and may not be square in shape.

LEARNING

The learning system is very complicated, and the information presented in this section is by way of example only.

In some instances (for example, whenever more than a critical number of mini-blocks must be sent to update a super-block) the entire previous 8*8 pixel super-block will be saved in the corresponding position on a copy of a memory image. Then when a block needs upgrading, the idealised block will be compared with the latest $2^n$ (for fixed n depending on the speed of the machines compressing and the compression rate required) cached super-blocks at this position as well as the previous frame, and the best super-block will be sent as well as the mini-block upgrades to this super-block. This allows the compression system to learn as it goes on what likely images will look like, thus increasing the quality and/or frame rate as time continues. This enables backgrounds and common foreground features to be learned effectively, and is ideally suited to applications where the camera is stationary and the background changes relatively little, for example a videophone.

Increases in computer speed will automatically facilitate recalling more information. In one implementation, the compression system remembers as many frames as it can recall, and recalls from the most recently stored until time runs out. Use an n bit code word to say which super block in memory is used. Most super-blocks will be updated from the latest frame, so in one possible implementation of the algorithm, the shorter code word %0 precedes such a super-block. If the super-block is to be based on a previously learned one, %1 is followed by an n bit number specifying which of the $2^n$ memories to use. Other systems are possible, depending on the distribution of memorised super-blocks.

The memories could be initialised to any values. In one implementation, each memory is initialised to a grey scale, with the grey scales spread uniformly throughout the possible intensity levels.

In a situation such as an interview where the camera shots continually change back and forth in a single frame, this learning capability will allow the changes to occur very efficiently compared with having to recompress the background. Similarly, in a videophone application, this allows the background to be stored in the case where someone moves their head backwards and forwards. There may be 8 memorised options to choose from for each 8*8 super-block, which are upgraded independently across the image. However, this makes editing systems harder to implement because of the amount of information needed in a key frame.

Source image format

In one application of the invention, the images being captured are all rectangular and the same size. The information about the video to be idealised is:

5 bits Y, for each pixel—which in one implementation is constructed by capturing the Y at 8 bits and taking the 5 most significant digits;

5 bits U for each 2*2 pixel block—which in one implementation is constructed by capturing the U at 8 bits for each pixel in the 2*2 block, averaging the four U values, and taking the nearest representable 5 bit value to the 10 bit average rounded to 5 bits;

5 bits V for each 2*2 pixel block—which in one implementation is constructed by capturing the V at 8 bits for each pixel in the 2*2 block, averaging the four V values, and taking the nearest representable 5 bit value to the 10 bit average rounded to 5 bits.

Other implementations may involve more bits per component, for example 6 bits of Y instead of 5.

IDEALISATION

Processing each video frame gives a version of the latest video frame which is best suited for compression. When the next frame is examined, it will typically differ from the current frame. If the original video came from an analog device such as a camera small changes may well be noise, and large changes are probably chances to the signal. However, consistent small changes are probably a small change in the signal.

The main purpose of the idealisation phase is to try to filter out the noise and keep the signal. A secondary purpose is to reduce the data rate needed to send the image with minimum loss of quality on the transmitted image.

In a typical implementation, each frame is treated in the same way as all other frames to prevent time dependent artifacts. Stored information about the past contains the value which would ideally have been transmitted for this pixel, as well as some extra information about how this value was arrived at, including whether it is likely to be an overestimate or an underestimate of the true value, and how accurate it is likely to be.

In a typical implementation, small differences in the pixel value are borne in mind until they accumulate to make a significant change or a large change occurs. Some knowledge of the noise distribution helps in deciding how to allow for noise.

Figure 2:
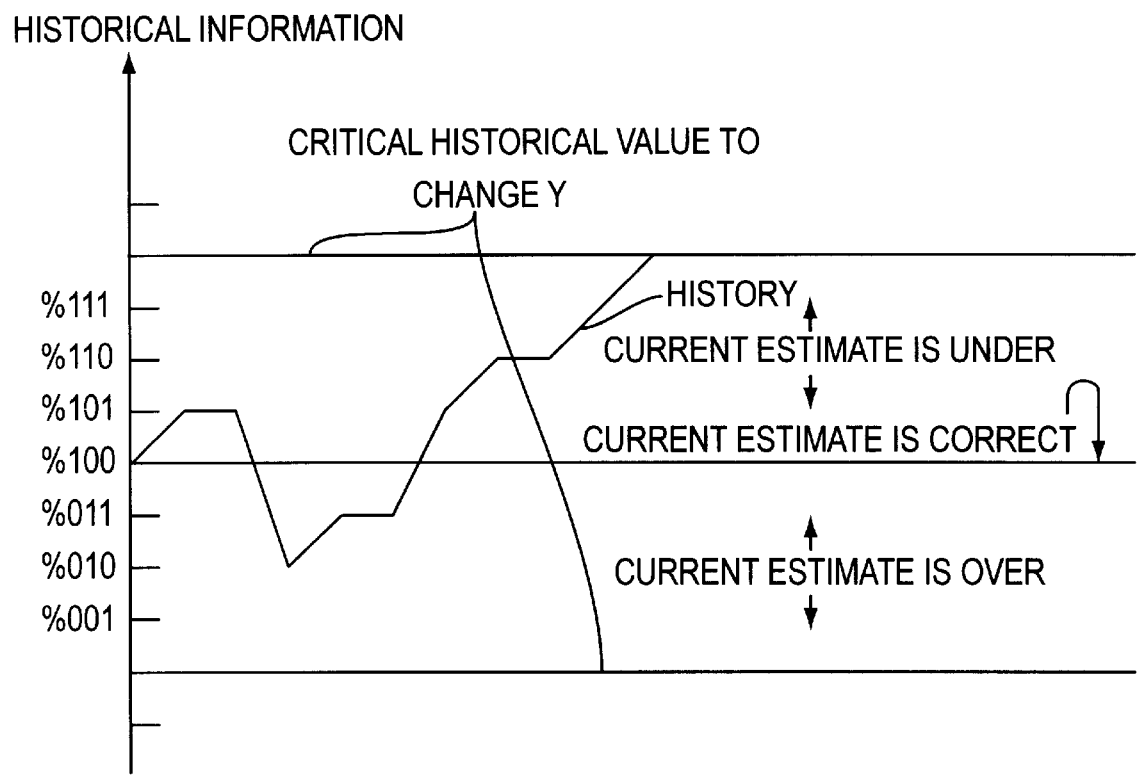
FIG. 2: an example of the Idealisation process.

See FIG. 2 for an example of how the historical information may vary with each frame.

Idealisation of the Y component in T

The compression system maintains an area of data with the same number of storage cells as there are pixels in each video frame. In one implementation of the invention (I2), each cell contains eight bits of information, representable as a binary number %hhhyyyyy, although the number of h bits and y bits can vary from one implementation to the next.

In I2, The least significant five bits contain the current best estimate of what intensity should be compressed on this frame.

In I2, the top three bits contain historical information about previous frames. The special value %000 denotes the fact that the best possible representation of this pixel has changed since the last frame and must be updated on this frame. In this case, the low five bits of the internal byte contain the value which will form the basis of the value to which the intensity should be upgraded.

In I2, the 8 bits described above, containing historical information, is combined with the 5 bits of current frame intensity to provide a 13 bit number. Each 13 bit number is then processed to convert it to a new 8 bit number of the same format as the 8 bit number mentioned above, which contains the idealised intensity for the current frame and three extra bits of information.

In I2, the luminance pixels are combined into 2 by 2 pixel mini-blocks, which are then coded as single entities. These mini-blocks correspond to the area covered by a single chrominance pixel.

In I2, conversion of the 13 bit number to a new 8 bit number is performed by use of a suitable look up table. Varying this look up table changes the effect of the program, for example by changing its tolerance to noise, without having to change any of the code itself.

Idealisation of the U and V components in T

In I2, U and V are idealised in the same way as each other. This is similar to Y, except a different function (look up table) can be used. Only historical information and information about the current frame is taken into account in the T case.

Idealisation of the Y component in S

In one implementation of the invention (I3), the compression system maintains an area of data with the same number of storage cells as there are pixels in each video frame. Each cell contains eight bits of information, representable as a binary number %hhhyyyyy.

In I3, the bottom five bits contain the current best estimate of what intensity should be compressed on this frame.

In I3, The top three bits contain historical information about previous frames. The special value %000 denotes the fact that the ideal representation of this pixel has changed since the last frame and must be updated on this frame. In this case, the low five bits of the internal byte contain the value which will form the basis of the value to which the intensity should be upgraded. In other implementations, a different number of h bits or y bits could be used.

In I3, the luminance pixels are combined into 2 by 2 pixel mini-blocks, which are then coded as single entities. These mini-blocks correspond to the area covered by a single chrominance pixel.

In I3, the internal 8 bits contain historical information is combined with the 5 bits of current frame intensity and the 5 bits of next frame intensity to provide an 18 bit number. Each 18 bit number is then processed to convert it to a new 8 bit number, which contains the idealised intensity for the current frame, and three extra bits of information. In one implementation, the 5 bits from the current frame and the 5 bits for the next frame are compressed into fewer bits before combining with the 8 bits of historical information. Other versions may have a different number of bits accuracy for each luminance pixel.

In I3, the program has a simple format. The main intelligence is performed by suitable use of a look up table (though it could be coded explicitly in software or hard wired in hardware). Varying this look up table chances the effect of the program. Effects include being able to change the compression rate, the quality on still frames, the ability to capture fast motion and the tolerance to source image noise.

Idealisation of the U and V components in S

U and V are idealised in the same way as each other. This is similar to Y, except a different function (look up table) can be used. Future frames are taken into account as well as past and present frames.

COMPRESSION

Figure 3:
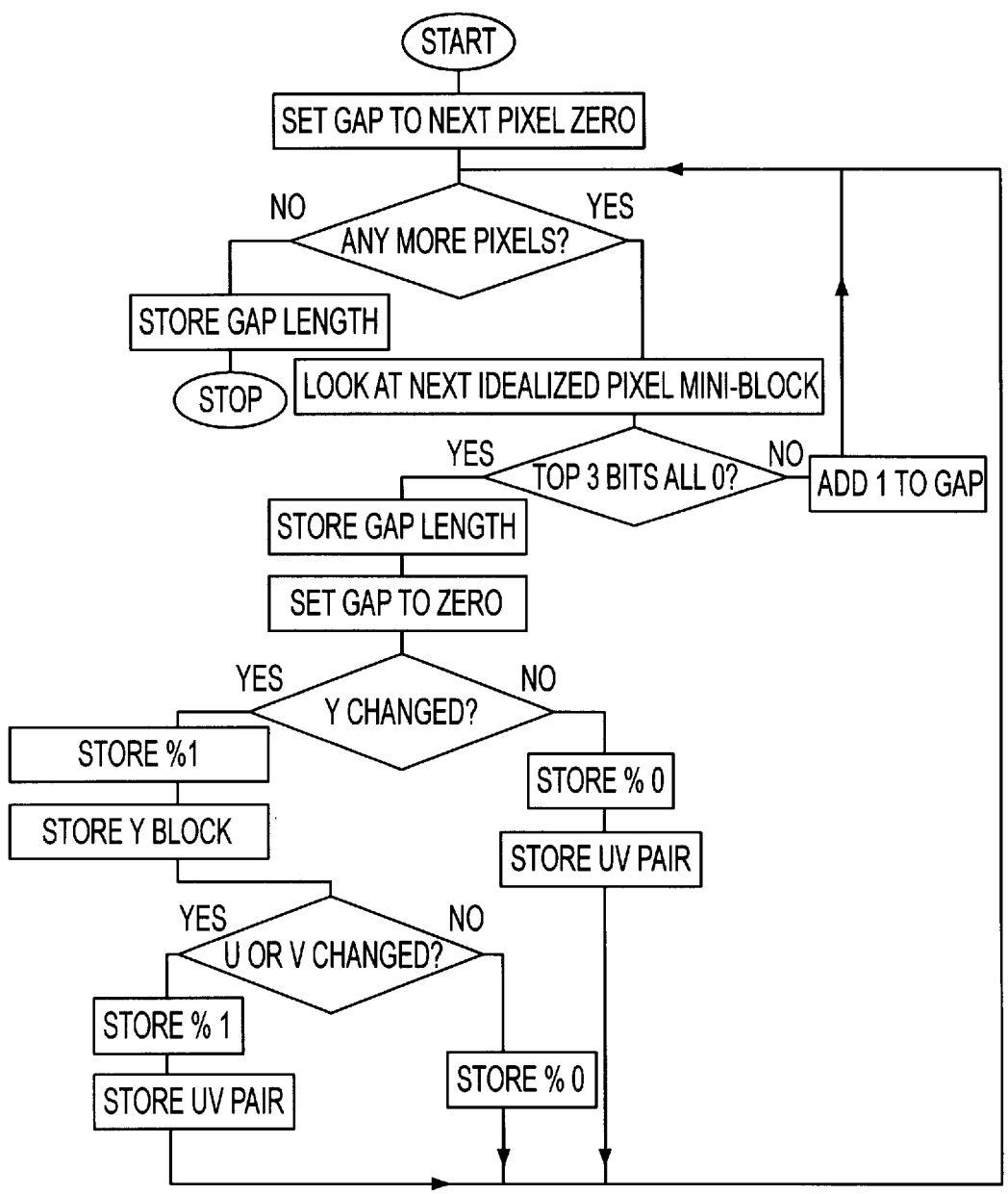
FIG. 3: flow chart of one implementation of the Compression method.

A flow chart outlining a simplified version of one possible implementation of the process performed in compression is outlined in FIG. 3.

Compression of the idealised image

In one example, once the image has been idealised as above, it is converted into a compressed bit stream. The idealised Y image is scanned and each 2*2 block of pixels is examined for the presence of %000 in the high three bits. The same operation is carried out on the UV pixel which corresponds to this Y block.

There are four possible outcomes to these tests.

[1] No changes in Y or UV. In this case go on to the next block.

[2] Change in Y only.
In this case, store the length to this block followed by %1, followed by
the compressed 2*2 Y block, followed by %0.

[3] Change to UV only.
In this case, store the length to this block, followed by %0, followed by
the compressed colour block.

[4] Change to both Y and UV. In this case, store the length to this block
followed by %1, followed by the compressed Y block, followed by %1,
followed by the compressed UV block.

Other examples may perform this operation in a different way. For example, chrominance may be absent completely.

Compressing the gaps between new pixels

The gaps consist of variable length code words—shorter gaps (which occur more frequently) have shorter code words. Skipping a line is coded as medium length code words. In one example, the order of the mini-blocks used to determine the gap size and the position of a mini-block at the end of the block is determined by the horizontal portions of the zig-zag line shown in FIG. 4. In a more general case, the lines follow a simple raster within each super-block, and the super-blocks rasterise as well.

In one implementation, the length to this block can be represented, among other ways, as follows:

[low bit rate] 2+7+13 bits, where the 13 bits only follows if the 7 bits are all 1s, and the 7 bits only follows if the 2 bits are all ones, and %00 on the 2 bits represents neighbouring blocks.

[high bit rate] 1+3+7+15, otherwise as above.

Different sizes of images and different picture qualities can lead to different ways of coding the lengths.

Figure 4:
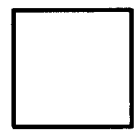
FIG. 4: relationship between pixels, mini-blocks, super-blocks and the image.
Figure 4:
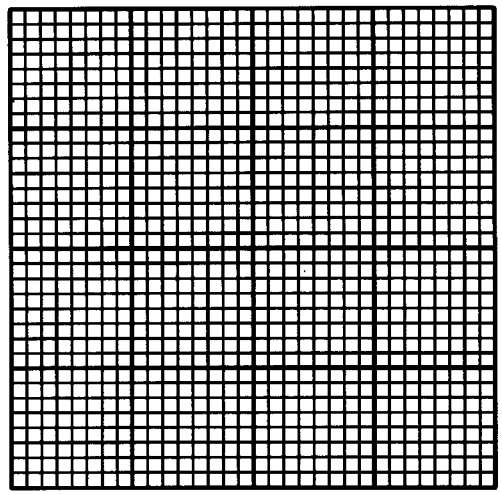
Figure 4:
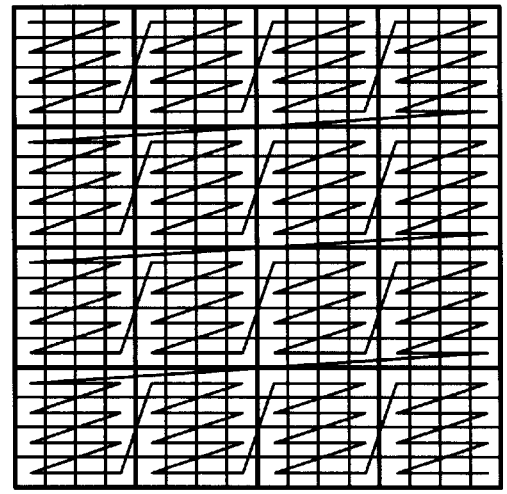

Higher compression rates can be obtained if a raster is replaced with a raster within 8*8 blocks which themselves rasterise—see FIG. 4.

Compressing the memory

When a mini-block needs updating, some indication of what super-block to base the update on is required. If this is the super-block at the corresponding position in the previous sent frame, then this is coded as a single bit eg %0 in the compressed bit stream. If, on the other hand, a better fit to the current frame is a previously memorised frame, then %1 then %x is sent, where x is a code word (of at least one bit in length) which specifies which memorised super-block to use.

Compressing the Y values

In one implementation of the invention, the 2*2 intensity blocks can be represented as follows:

all four intensities the same=>use %000YYYYY. Otherwise, x=minimum intensity, X=maximum intensity, use %pppyyyyyYYYYY, where {x, X}={y, Y} and y=top left intensity of block, and bit set in ppp corresponds to which of y or Y to use at this position within the block. (See FIG. 6 and the section on the 5 bit per pixel error look up tables—ISDN videophone. pppyyyyyYYYYY→ppppyyyyyy ie y pair is stored. This keeps smooth backgrounds.

Compressing the UV values

U and V are coded together in a single variable length code word. The central 7*7 values of U and V are exact and coded as 6 bits, with values outside this range accurate to +−1, with values coded as 8 bit numbers. The first 6 bits of any of the 8 bit code words are different from any of the 6 bit code words.

Figure 5:
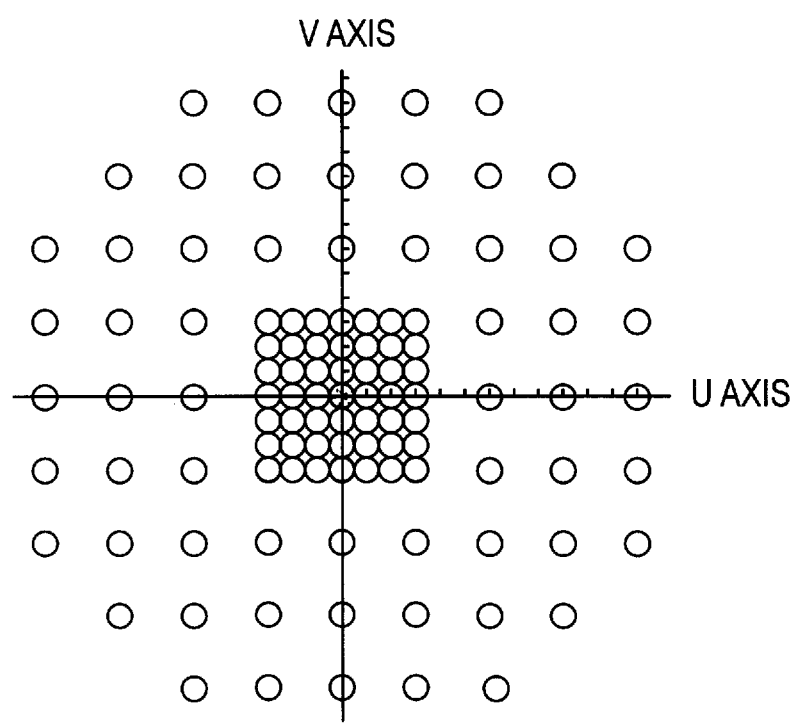
FIG. 5: diagram showing one possible distribution of colour code words.

The chrominance is represented as follows: there is higher accuracy and shorter code words near the centre: the central 7*7 are represented exactly with 6 bit code words, and the outer values of UV (which are the much rarer stronger colours) are stored as the remaining 8 bit code words to within 1 in both U and V—see FIG. 5.

Use of information

S is usually stored on disc, T is usually transmitted.

DIFFERENCES BETWEEN S and T

S is similar to T. In this case, a larger latency is allowed between digitising a video frame and it being compressed. This could be used for non-real time transmissions or for storage on disc for future use.

In S, frames are compressed on average in real time (although any individual frame may take more or less than real time).

This will involve looking at part frames and one frame into the future.

In T, the information is captured in real time through video and audio digitisers as well as compressed in real time.

IMPLEMENTATION VARIANTS

Capture at full frame rate

If full frame rate capture is required, slow digitisers may require the idealising and the capturing to be performed sequentially.

Capture at ½ frame rate

With capture at only half the frame rate, there is enough time to perform significant processing on the image as it is being captured. This reduces the overall computer power needed for real time compression.

Capture in grey scale

If capture is only required in black and white, there is significantly more time to process the signal before compression. When only grey scale images are required, the U and V components are not captured, idealised or compressed. In particular, any mini-block which is updated must be due to the intensities being renewed.

Capture in colour

Colour is captured at a spatially lower resolution than intensity. This increases the compression rate with little effect on the perceived picture quality.

Capture of sound

In one possible implementation of the invention, sound capture could be performed on the same computer as the image capture. In this case, one possibility would be for sound to be stored on an on chip FIFO until it is needed. Every time a line of video is compressed, the FIFO is emptied.

LOOK UP TABLES

T case

There are many possible ways in which look up tables can be used in this invention. It has been designed throughout with look up tables in mind. The cases in this section are by way of example only. The invention allows very flexible actions by altering the look up tables.

There are 8 bits of historical information. The new intensity is currently 5 bits. ie entry to look up table is allowed to be 13 bits. This could be expanded to 6 bits for input, with eg an exponential format for intensity.

If the top three bits are all zero, the pixel is updated. Otherwise the pixel is not updated. The bottom 5 bits of the internal value contain the latest compressed value after compression has happened. This value is not affected by the loss free compression itself, but could be changed by lossy compression to assist with compression. For example, if only one pixel in a block has changed, and then only slightly, it could be put back. Changes could reinforce across block boundaries, to enable all the changes in an area to be coded on one frame.

More simply, the three top bits could signal that the intensity could optionally be increased of decreased by 1. The ideal screen would then be adjusted by the compression program if necessary. This would help to prevent a whole block being updated when a single pixel was one grey level out on one frame. Also, if it was persistently out, it could still be corrected for—see FIG. 2.

Top 3 bits of the 8 bits of historical information:
%111=>too high
%110
%101
%100=>current estimate is best estimate
%011
%010
%001=>too low
%000=>just updated Example effect of difference between grabbed pixel and ideal pixel being value below:
+-1=>adjust 3 bit history by 1
0=>set to exact
=-2=>adjust by 2 or set to exact new value
>change=>set to new value The effect can vary with intensity if required, as the full 5 bits from the previous frame and the new frame are included. For example, the idealisation could be more sensitive at lower intensities, where signal is fewer bits and the eye is more sensitive to it.

S case

There are many possible ways in which look up tables can be used in this invention. It has been designed throughout with look up tables in mind. The cases in this section are by way of example only. The invention allows very flexible actions by altering the look up tables.

There are 5 bits of pixel information about the current idealised pixel. There are 3 bits of additional information which is not displayed directly The intensity on the current frame is 5 bits.

The intensity on the next frame is 5 bits.

The current and next frame intensities are combined, for example by means of a look up table, to provide a number of about 8 bits. This is then combined with the 8 bits of past data to produce a 16 bit number. This is then converted into the next 8 bit number containing 5 bits of idealised pixel value and 3 extra bits of information which is not displayed.

LOSSY VERSION (SOME T CASES)

This is similar to the loss free version, but the gaps are bigger, and the ideal image is not always coded exactly. This applies particularly when small changes occur.

A copy of what was sent is kept (and which may not the same as the idealised image in this lossy case). The transmitted image is updated if the error is large and if there is enough spare bandwidth.

The cases given below refer only to the luminance component.

4 bit per pixel error look up tables—PSTN videophone

In a typical 4 bits per pixel version, each mini-block is compressed to 9 bits. This 9 bits is then combined with the 9 bits for the previous compressed block to give an 18 bit number. When this number is used as the address to a look up table, the difference between two compressed blocks can therefore be calculated with a lookup of 1 bit—a minimum of 32768 bytes. The bit can signify whether the new version has changed enough from the previous version to be worth upgrading the block at all. This removes the need for any pixel-by-pixel tests, as a whole block can be tested in one go.

The compressed block contains a 3 bit number saying which of the ordered pair the 2nd, 3rd and 4th pixels in each mini-block come from (the first pixel always being the first of the ordered pair). The remaining 6 bits, in one implementation, are outlined below. When Y pair values are compressed which are not in the list, the nearest representation in the list is used.

In one implementation, the code words for the ordered pairs of Y values are:
WHEN 0: y%=0: Y%=1
WHEN 1: y%=1: Y%=2
WHEN 2: y%=2: Y%=3
WHEN 3: y%=3: Y%=4
WHEN 4: y%=4: Y%=5
WHEN 5: y%=5: Y%=6
WHEN 6: y%=6: Y%=7
WHEN 7: y%=7: Y%=8
WHEN 8: y%=8: Y%=9
WHEN 9: y%=9: Y%=10
WHEN 10: y%=10: Y%=11
WHEN 11: y%=11: Y%=12
WHEN 12: y%=12: Y%=13
WHEN 13: y%=13: Y%=14
WHEN 14: y%=14: Y%=15
WHEN 15: y%=1: Y%=0

WHEN 16: y%=2: Y%=1
WHEN 17: y%=3: Y%=2
WHEN 18: y%=4: Y%=3
WHEN 19: y%=5: Y%=4
WHEN 20: y%=6: Y%=5
WHEN 21: y%=7: Y%=6
WHEN 22: y%=8: Y%=7
WHEN 23: y%=9: Y%=8
WHEN 24: y%=10: Y%=9
WHEN 25: y%=11: Y%=10
WHEN 26: y%=12: Y%=11
WHEN 27: y%=13: Y%=12
WHEN 28: y%=14: Y%=13
WHEN 29: y%=15: Y%=14
WHEN 30: y%=0: Y%=5
WHEN 31: y%=1: Y%=6
WHEN 32: y%=2: Y%=7
WHEN 33: y%=3: Y%=8
WHEN 34: y%=4: Y%=9
WHEN 35: y%=5: Y%=10
WHEN 36: y%=6: Y%=11
WHEN 37: y%=7: Y%=12
WHEN 38: y%=8: Y%=13
WHEN 39: y%=9: Y%=14
WHEN 40: y%=10: Y%=15
WHEN 41: y%=5: Y%=0
WHEN 42: y%=6: Y%=1
WHEN 43: y%=7: Y%=2
WHEN 44: y%=8: Y%=3
WHEN 45: y%=9: Y%=4
WHEN 46: y%=10: Y%=5
WHEN 47: y%=11: Y%=6
WHEN 48: y%=12: Y%=7
WHEN 49: y%=13: Y%=8
WHEN 50: y%=14: Y%=9
WHEN 51: y%=15: Y%=10
WHEN 52: y%=0: Y%=10
WHEN 53: y%=1: Y%=11
WHEN 54: y%=2: Y%=12
WHEN 55: y%=3: Y%=13
WHEN 56: y%=4: Y%=14
WHEN 57: y%=5: Y%=15
WHEN 58: y%=10: Y%=0
WHEN 59: y%=11: Y%=1
WHEN 60: y%=12: Y%=2
WHEN 61: y%=13: Y%=3
WHEN 62: y%=14: Y%=4
WHEN 63: y%=15: Y%=5

Estimating errors between estimates and actual

This can be implemented using look up tables. The two compressed blocks are compared. If they are the same, the error is zero. If not then an error function depending on the differences between the corresponding pixels in each block is used.

5 bit per pixel error look up tables—ISDN video phone

Mini-blocks are compressed less here than in the 4 bits per pixel case, because picture quality is at a premium. This means that a compressed block can take up to 3+5+5=13 bits, so stringing two of these together to form an address is impractical. It is worth compressing the 5+5 pair (eg in a look up table) to 6 bits. Also, currently, many blocks are being saved even though they are compressed to be the same as the previous block.

Figure 6:
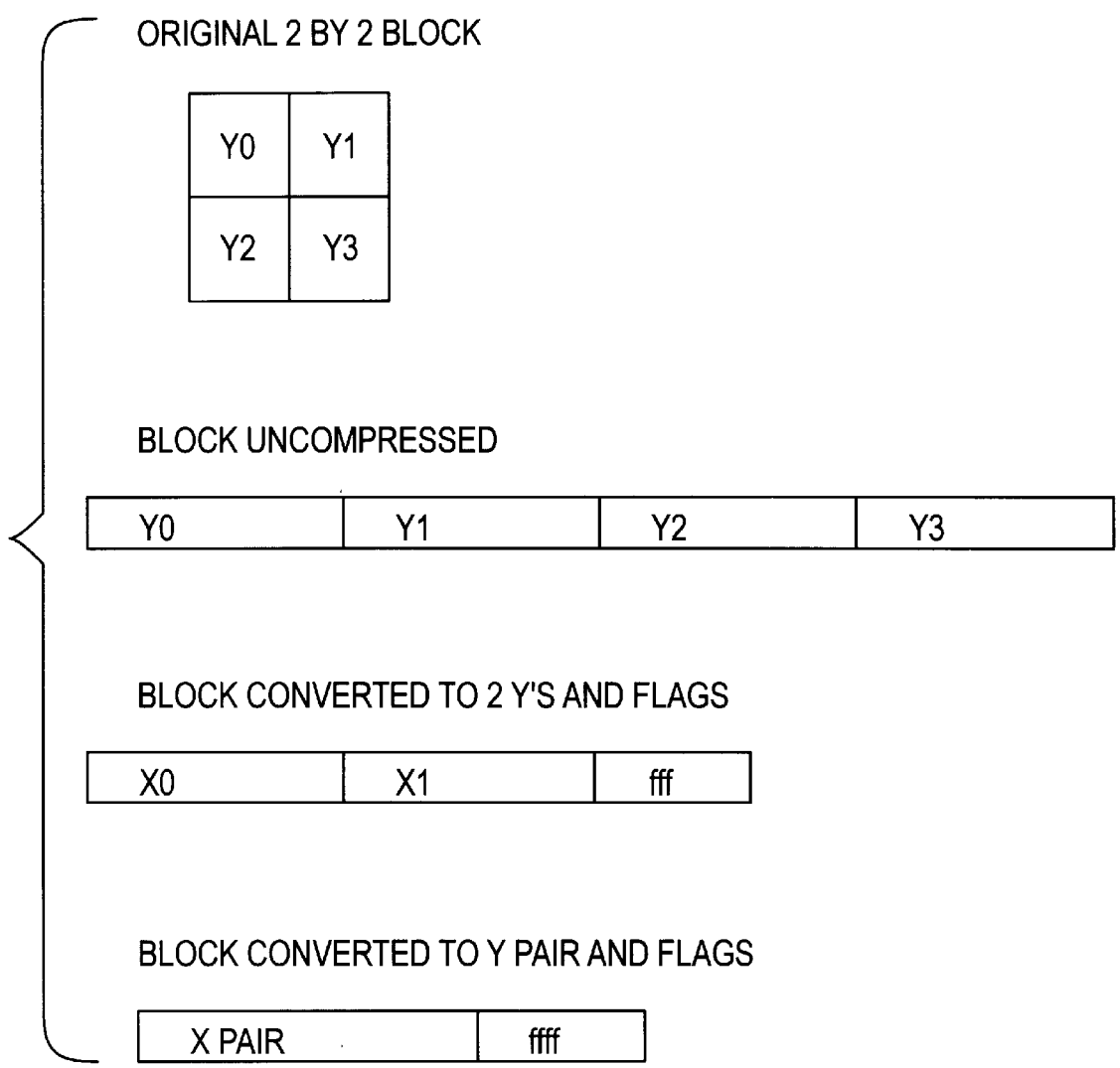
FIG. 6: compression of luminance pixels into mini-blocks.

See FIG. 6.

The four Y pixels in a mini-block are approximated by either one intensity or two intensities (for example the maximum and minimum intensity) and the position of each pixel in the mini-block.

In one implementation, if four Ys in a mini-block are the same, the luminance block is compressed as %0000YYYYY. In this implementation, if the four Ys are not all the same, the compressed block contains a code word which consists of 4 bits to say whether to use the smaller or the larger of the two compressed Y values, for each of the four pixels in the mini block.

In this particular example, the actual values of the Y pair are compressed as follows. When Y pair values are compressed which are not in the list the nearest representation in the list is used. In other cases, different compression systems which follow the same broad principles are possible.

In one implementation, the code words for the unordered pairs of Y values are:

WHEN %000000: y%=0: Y%=1
WHEN %000001: y%=1: Y%=2
WHEN %000010: y%=2: Y%=3
WHEN %000011: y%=3: Y%=4
WHEN %000100: y%=4: Y%=5
WHEN %000101: y%=5: Y%=6
WHEN %000110: y%=6: Y%=7
WHEN %000111: y%=7: Y%=8
WHEN %001000: y%=8: Y%=9
WHEN %001001: y%=9: Y%=10
WHEN %001010: y%=10: Y%=11
WHEN %001011: y%=11: Y%=12
WHEN %001100: y%=12: Y%=13
WHEN %001101: y%=13: Y%=14
WHEN %001110: y%=14: Y%=15
WHEN %001111: y%=15: Y%=16
WHEN %010000: y%=16: Y%=17
WHEN %010001: y%=17: Y%=18
WHEN %010010: y%=18: Y%=19
WHEN %010011: y%=19: Y%=20
WHEN %010100: y%=20: Y%=21
WHEN %010101: y%=21: Y%=22
WHEN %010110: y%=22: Y%=23
WHEN %010111: y%=23: Y%=24
WHEN %011000: y%=24: Y%=25
WHEN %011001: y%=25: Y%=26
WHEN %011010: y%=26: Y%=27
WHEN %011011: y%=27: Y%=28
WHEN %011100: y%=28: Y%=29
WHEN %011101: y%=29: Y%=30
WHEN %011110: y%=30: Y%=31
WHEN %011111: y%=0: Y%=10
WHEN %100000: y%=2: Y%=12
WHEN %100001: y%=4: Y%=14
WHEN %100010: y%=6: Y%=16
WHEN %100011: y%=8: Y%=18
WHEN %100100: y%=10: Y%=20
WHEN %100101: y%=12: Y%=22
WHEN %100110: y%=14: Y%=24
WHEN %100111: y%=16: Y%=26
WHEN %101000: y%=18: Y%=28
WHEN %101001: y%=20: Y%=30
WHEN %101010: y%=0: Y%=20
WHEN %101011: y%=2: Y%=22
WHEN %101100: y%=4: Y%=24
WHEN %101101: y%=6: Y%=26
WHEN %101110: y%=8: Y%=28
WHEN %101111: y%=10: Y%=30
WHEN %110000: y%=0: Y%=3
WHEN %110001: y%=2: Y%=4
WHEN %110010: y%=4: Y%=5
WHEN %110011: y%=6: Y%=9
WHEN %110100: y%=8: Y%=11

WHEN %110101: y%=10: Y%=13
WHEN %110110: y%=12: Y%=15
WHEN %110111: y%=14: Y%=17
WHEN %111000: y%=15: Y%=18
WHEN %111001: y%=16: Y%=19
WHEN %111010: y%=18: Y%=21
WHEN %111011: y%=20: Y%=23
WHEN %111100: y%=22: Y%=25
WHEN %111101: y%=24: Y%=27
WHEN %111110: y%=26: Y%=29
WHEN %111111: y%=28: Y%=31

PLAYBACK

When a picture is played back, the number of pixels on the display can be increased quite simply by replicating the pixels into 2 by 2 pixel blocks. However, this can lead to undesirable artifacts on the image.

In an improved version, the expanded image could be filtered as follows:

Do a 3 by 3 filter centred around each pixel. Although there are 9 pixels in the 3 by 3 square, there are a maximum of four different intensities. One of these occurs 4 times, two occur twice and one occurs once. (See FIG. 7). Thus a look up table containing a 4+4+4+4 or 5+5+5+5 bit address can be used to produce the filtered pixel.

Filtering which looks good is: median on low intensity variation systems, mean on high intensity areas (giving antialiasing effects).

The expanded picture contains 2 by 2 squares. Although each 3 by 3 area contains 9 pixels, there are at most 4 different intensities in this region. In the case where they are all different, one of these occurs exactly 4 times, two occur exactly twice and one occurs exactly once. Simpler cases occur when the pixels are not all different.

In one implementation, a look up table is used to convert the 4 different intensity pixels to a new value. In one instance, this value is the 3 by 3 median filter for low contrast areas, and an arithmetic mean filter for high contrast areas to simulate anti-aliasing.

See FIG. 7 showing expanded image ready for filtering.

In the case where the look-up tables would have been to big, only three pixels are needed in the filtering—namely that which occurs 4 times and those which occur two times each. In the case where both the twice occurring pixels are the same, these are given more weight to reflect the fact that these are spatially nearer the implicit ninth element in the 3*3 square. The effect of this alternative is to reduce the lookup table size by 32 times in the 5 bit Y case, with almost no change in image quality.

VARIANTS OF THE INVENTION

Could a 4*4 block be used?

Four Ys used could be equally spaced between min and max. With two bits per pixel, this would take 2*5+15*2=40 bits—ie some advantage in compression rate over 2*2 blocks. For really high compression rates, 4*4 blocks with a choice of 2 Ys will give 2*5+15=25 bits—ie twice as good as 2*2 blocks. However, the blocks would have to be updated more often as something in the block is more likely to change, so this will be relatively more useful in pictures which change significantly.

Transparency

If each upgraded block included a transparent colour (0) or an opaque colour, then even 5 bits per pixel could be compressed to 4+5 bits=9 bits. This is the same as the 4 bits per pixel was. This could be compressed to 8 bits per block (a good aim because it allows a compact block compressed image to be stored) if only changes to opaque pixels are stored, and these are stored as +1,+2,+3,+4,+6,+8,+12,+16 and their negatives. In fact, if the original Y is near 0 or 31, this range can be adjusted.

EXAMPLE APPLICATIONS

| Data rate | Application | Approximate resolution |
|---|---|---|
| 14.4 kb/s | PSTN videophone | QCIF b/w |
| | Security systems | CIF b/w |
| 64 kb/s | ISDN videophone | QCIF col |
| 128 kb/s | ISDN video conferencing | QCIF col |
| 256 kb/s | Radio link | Near CIF |
| | In Flight live transmission | Near CIF or CIF |
| | Defence applications | CIF or high frame rate QCIF |
| 400 kb/s | Low bandwidth disc version | High frame rate QCIF, low frame rate CIF |
| 1.2 Mb/s | CD-ROM multimedia/games | CIF |
| 2.4 Mb/s | MO disc, Ethernet | Professional editing systems, CIF |
| 10 Mb/s | Hard disc | >CIF - corporate videos |

SUMMARY OF IMPORTANT FEATURES OF THE INVENTION

In S case, symmetry between light/dark, past/future, top/bottom, left/right.
Compression of 2*2 luminance blocks compactly—concentrate on low contrast edges.
Updating luminance and chrominance separately.
Ordering of mini-blocks to minimise average gap code word length.
Learning system.
Real time compression for transmission.
Real time compression for storage.
Idealising Y pixels for transmission.
Idealising Y pixels for storage.
Guidelines for improving image quality/compression rate.
Hierachy of pixel (Y pixel), mini-block (UV pixel, Y block), super-block (learned area).
Method for reducing YUV to 5 bits each.
Use of luts for idealising image.
Use of luts to compress Y—hardware possible.
Use of luts to compress (U,V) pair.
Colours compression accurate with small code words near centre.
Lossy compression version—when to update blocks.
Idea of processing image before compression (idealisation). ie capture—idealise—compress—store/transmit.
De-noising.
Efficient filtering to expand image.
Idea of how to use an arbitrary amount of computer time eg on learning
—playback is same speed

I claim:

1. A method of processing digital video information in an adapted format for real time transmission or storage after compression; said method comprising:

reading digital data representing individual picture elements (pixels) of a video image frame as a series of binary coded words, encoding to derive from the words representing individual pixels further words describing individual first and second associated blocks or groups of pixels of which each second group is a sub-set of an associated first group and is described by a single derived word which at least includes a representation of the luminance of a miniblock composed of no more than 4×4 individual pixels, comparing and evaluating the words of the second groups representing corresponding portions of one frame with another frame or other frames in a predetermined sequential order of the elements making up successive first groups to detect differences and hence changes, using the comparison to take the words of the second groups to represent all the individual pixels described by the associated first groups as the processed information whenever the detected change is significant; and using variable length code words to represent the number of consecutive individual pixels of the second groups without significant change.

2. A method according to claim 1, wherein the words representing corresponding portions of the one frame are derived from a current frame and the other frame or frames are previous frames and/or in the case of storage succeeding frames.

3. A method according to claim 1 and further comprising storing for use in the comparison step information from the first group representing a portion of an entire frame and using a code word to describe the stored information to enable the stored information to be analysed and used whenever a significant change is subsequently detected and the stored information is also acceptable to describe the corresponding portion of the current frame.

4. A method according to claim 3 wherein the storing step involves storing a plurality of such code words representing like portions of a number of frames for use in the analysis step which are temporally spaced apart from one another by different time intervals with older frames tending to be temporally spaced by progressively greater time intervals.

5. A method according to claim 1 and further comprising assessing the respective words representing pixels to ascertain changes between portions of one frame and the other frame or frames to detect changes likely to signify noise or extraneous effects present in the video image and using this assessment to filter out information attributable to such noise or extraneous effects.

6. A method according to claim 5 wherein the assessment step continuously maintains optimally large corresponding successive portions of frames with uniform pixels.

7. A method according to claim 5 wherein the assessment produces a multi-bit code signifying the extent of the detected change on a cumulative basis for both luminance and chrominance comparisons and there is a range of cumulative bit value changes and/or rates of bit value changes which are acceptable as signifying noise or extraneous effects and which are filtered out and two limiting cumulative changes and two limiting bit value changes which if exceeded are taken as signifying a real change in the image which require the words representing the image to be updated by being replaced by other words and information.

8. A method according to claim 5 wherein the assessment is performed before the comparison and evaluation, there is a threshold of acceptable changes before the change is taken as significant and the compressed version of the current frame is continuously stored and updated.

9. A method according to claim 1, wherein the digital data which is read in comprises words of up to 8 bits for pixel luminance and words of up to 8 bits for each component of pixel chrominance, and the derived words each have the least significant bits describing the pixel chrominance or luminance and the most significant bits describing the relationship between the pixel chrominance or luminance and that of the other frame or frames.

10. A method according to claim 9 wherein the luminance and chrominance pixels are evaluated separately.

11. A method according to claim 9, wherein the first group of pixels is composed of 4×4 blocks each composed of the second group which consists of both a 2×2 block of luminance pixels and a 1×1 block of chrominance pixels.

12. A method according to claim 9 wherein stored data representing the pixels is scanned in a predetermined raster sequence running successively through the second group of pixels, each second group of pixels is assessed from the presence of the most significant bits representing whether a significant change has occurred and only where this is the case is the stored data further compressed into its corresponding first group.

13. A method according to claim 9, wherein each of the second group of words defining pixel luminance is derived by compressing the pixel luminance values in first and second stages, the first stage comprising calculating the maximum and minimum values of pixel luminance in the pixel block as well as indicators of whether each pixel is nearer the maximum or the minimum and the second stage involving combining the values calculated in the first stage to form a shortened code word.

14. A method according to claim 13 wherein the shortened codewords are selected from a set in which all adjacent or close maximum and minimum values are represented and some medium and large differences therebetween with values are represented and the selection is based on the mean of the maximum and minimum values represented by the codewords being as near as possible to the mean of the calculated values, the minimum codeword values≧the minimum calculated values, the maximum codeword values≦the maximum calculated values, and the difference between the maximum value in the codewords and the minimum value in the codewords being as large as possible.

15. A method according to claim 1, wherein the comparing step is effected by the use of look-up tables.

16. A method according to claim 1 and further comprising storing and reading the compressed data representing the video image frames, or receiving the transmitted compressed data and subjecting the data which is read or received to decompression.

17. A method according to claim 16 wherein the decompression step is enhanced by a further processing of the data representing luminance pixels, said process involving the replication of each pixel, into a 2×2 pixel block, evaluating the pixel values in the said block by either combining the values of neighbouring pixels or comparing adjacent pixel values derived from different replicated pixels, and calculating the median or the mean depending on the differences, and wherein when the evaluation involves the comparison and the adjacent pixel values are the same and the median case applies then the adjacent pixel value is adopted.

* * * * *